July 31, 1951 — G. C. MAYFIELD — 2,562,675
PISTON RING EXPANDER
Filed May 17, 1946
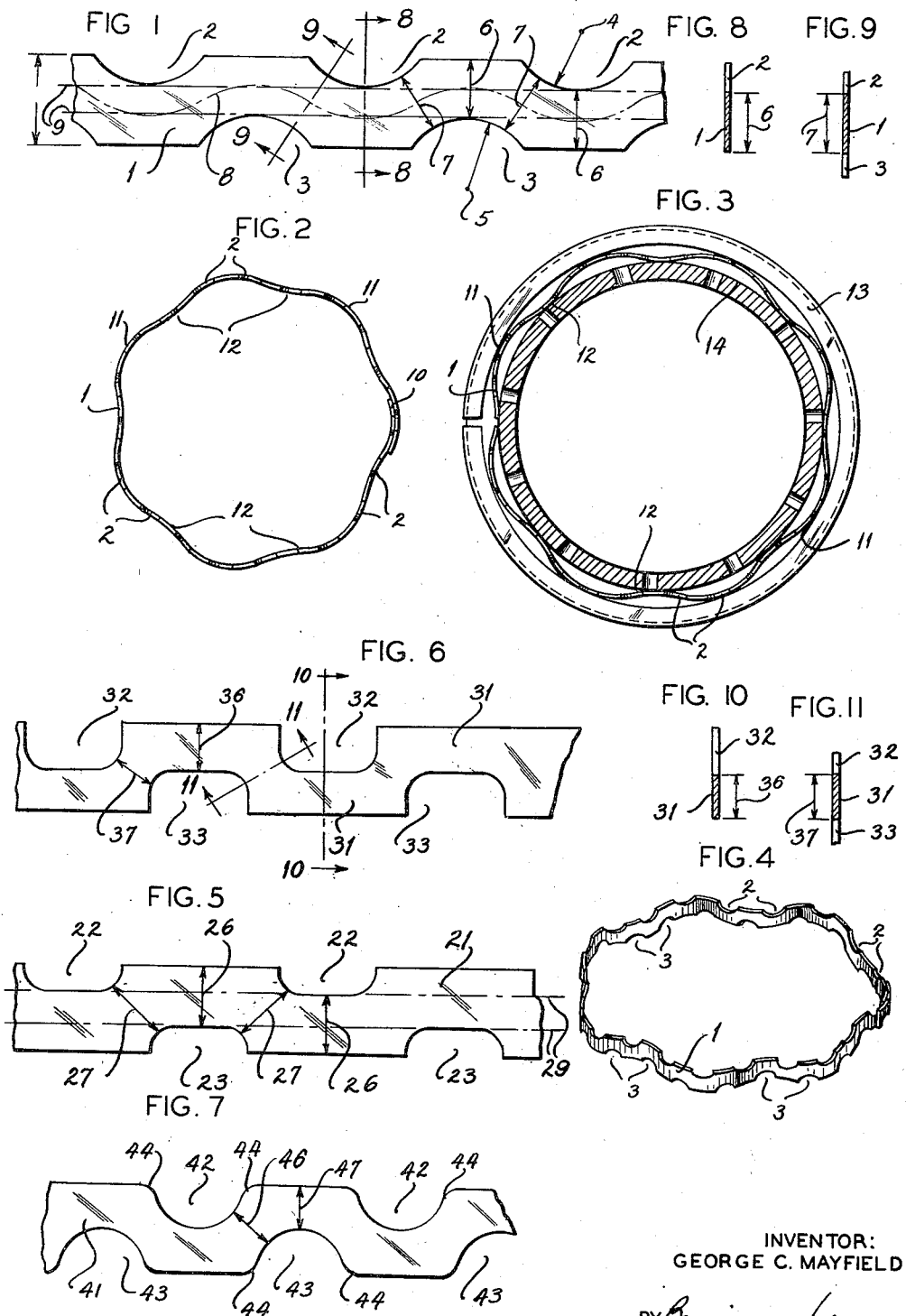
INVENTOR:
GEORGE C. MAYFIELD
BY
ATTORNEYS Patented July 31, 1951

2,562,675

UNITED STATES PATENT OFFICE 2,562,675

PISTON RING EXPANDER

George C. Mayfield, Richmond Heights, Mo., assignor to McQuay-Norris Manufacturing Company, St. Louis, Mo., a corporation of Delaware Application May 17, 1946, Serial No. 670,426

6 Claims. (Cl. 309—43)

1

This invention relates generally to expander springs of the character utilized for increasing the pressure exerted by a piston ring upon the cylinder wall of an internal combustion engine.

Piston ring expanders of the general character referred to are familiar to the art and are generally formed of a ribbon of resilient material, such as spring steel, crimped in any variety of fashions so that, when the expander spring is seated against the bottom of the ring groove in a piston, it will urge the piston ring in that groove outwardly into firm engagement with the cylinder wall. Such expander springs are most frequently crimped so as to present a generally polygonal shape. With the polygonal shaped expander, there is a limited area of contact between the expander spring and the piston ring with a very substantial area of contact between the expander spring and the bottom of the ring groove. The excessive area of contact between the expander spring and the bottom of the ring groove introduces a frictional drag upon the expander, which not only reduces the liveliness of the ring assembly, but in fact results in non-uniformity of pressure about the periphery of the piston ring being acted upon.

In order to overcome such disadvantage of the polygonal type expander, the so-called "reverse loop" expander was developed. One example of such a reverse loop expander is disclosed in the patent to Dallas M. Smith, No. 2,059,179. In such a reverse loop type expander, there is but a limited area of the expander spring in contact with the bottom of the ring groove and consequently the frictional drag aforesaid is minimized, so that greater uniformity of pressure throughout the periphery of the ring is achieved, as well as a lively structure. While the reverse loop type expanders have proved efficacious with compression rings, the presence of notches or apertures necessary for ventilating an expander used in connection with an oil ring appeared to destroy the advantageous uniformity of tension which characterized imperforate and uninterrupted reverse loop expanders.

The object of the present invention is to provide a ventilated expander element, which may be formed as a reverse loop expander, without sacrificing the advantageous uniformity of tension which characterizes imperforate and uninterrupted reverse loop expanders.

Another object of the invention is to provide a mode of ventilating expander springs, which is applicable to both the polygonal and the reverse loop type and will be productive of an increased activity and prolonged life of the expander.

2

Other objects will become apparent to those skilled in the art when the following description is read in connection with the accompanying drawings, in which:

Figure 1 is a plan view of a strip of ribbon spring metal ventilated in accordance with the present invention;

Figure 2 is a plan view of a completed reverse loop type expander constructed of the stock shown in Figure 1;

Figure 3 is a sectional view taken through the ring groove of a typical piston showing the correlation of the bottom of the ring groove, the expander spring, and a piston ring;

Figure 4 is a perspective view of the expander shown in Figure 2, the same being in its free condition;

Figures 5, 6, and 7 are views corresponding to Figure 1, but showing different embodiments of the invention;

Figures 8 and 9 are sectional views taken along lines 8—8 and 9—9, respectively, of Figure 1; and Figures 10 and 11 are sectional views taken along lines 10—10 and 11—11 of Figure 6.

While the present invention contemplates the utilization of resilient flat ribbon stock, such as ribbons of spring steel of the character heretofore employed for the manufacture of piston ring expanders, the invention is characterized by an arrangement of ventilating notches, which not only facilitates production, but also results in a structure having practically uniform resilience throughout its entire periphery. The uniformity of resilience is a result of maintaining the cross section of residual ribbon substantially constant, not only in area but also in shape, at each increment throughout the entire length of the expander. Such uniformity of resilience enables the production of ventilated expanders of the "reverse loop" type without sacrifice of the beneficial distribution of tension which characterizes unventilated reverse loop expanders.

Referring now to Figure 1 of the drawings, it will be understood that, in accordance with the usual practice in the art of making piston ring expanders, suitably tempered spring metal is provided in the form of flat ribbons having parallel straight edges and being relatively wide as compared with their thickness. Such a ribbon of spring material is then run through a suitable pair of dies in order to notch the edges thereof to provide ventilations. The present invention contemplates a particular arrangement, proportioning and orientation of such notches in order to produce an expander having substantially uniform strength and springiness from end to end.

In the preferred embodiment shown in Figure 1, such a strip of expander spring stock 1 is notched at the opposite edges thereof, as shown at 2 and 3. The notches 2 are substantially equi-sized and equi-spaced throughout the entire length of the expander. Likewise the notches 3 are substantially equi-sized and equi-spaced to the same degree as the notches 2. The notches 2 and 3 in the opposite edges of the expander are, however, staggered and so arranged and proportioned that the web of ribbon material remaining after the notching operations is of a substantially constant cross section, both as to area and shape, throughout the entire length of the expander.

As shown in Figure 1, the notches 2 and 3 are arcs of a circle, whose centers 4 and 5 lie outwardly beyond the margin of the strip of stock 1. The notches 2 and 3 are so arranged and proportioned that the widthwise distance, indicated by the numeral 6, from the zenith of one notch to the immediately opposite marginal edge is the same, regardless of whether it is measured from a notch in one edge or the other, and is also equal to the distance, indicated by the numeral 7, whereby each notch is separated from the closest notches on all sides.

In the embodiment shown in Figure 1, the arrangement is such that the residual web remaining after the notching operation is substantially sinuous widthwise, the axis of such sinuous web being indicated by the broken line 8. While the corners immediately adjacent the notches 2 and 3 detract from the true sine form of such web, such departure is not sufficient in magnitude to interfere with the desirable characteristics of the expander. In fact, throughout the length of the expander, the width of the residual web measured normal to the line 8 at each increment is within 6%, plus or minus, of 70% of the overall width of the initial stock. The maximum departure from such 70% of the width of the initial stock occurs at the corners adjacent the notches 2 and 3, but, since these corner areas are substantially cantilever in form, they do not interfere substantially with the uniformity of resilience and strength throughout the entire length of the expander, but, if desired, instead of permitting the notches 2 and 3 to merge into edges of the strip 1 as a sharp corner, the same may be rounded off.

In the form shown in Figure 1, the arrangement of notches is such that they do not penetrate a central band, defined by broken lines 9 in Figure 1. The lines 9, therefore, define an uninterrupted, imperforate central band, which extends throughout the length of the expander and has a width, in the embodiment shown, of approximately 40% of the overall width of the expander. In cases where it is desired to provide a particularly strong expander, such an uninterrupted central band is advantageous and should constitute at least a third of the overall width of the expander.

After the notches 2 and 3 have been formed in the marginal edges of a strip of expander stock, the strip is crimped and curved so as to form a complete loop, which, as shown in Figure 2, is of the reverse loop type, but may well be of the more familiar polygonal type. In the free form shown in Figure 2, the ends of the expander overlap, as shown at 10. The reverse loop type expander shown in Figure 2 is so crimped as to provide a plurality of outwardly curving portions 11 interconnected by inwardly curving portions 12. The outwardly curving portions 11 have a lesser radius of curvature than the complete expander and the center of such radius lies within the complete expander, but eccentric from the axis thereof. The interconnecting curved portions 12 have their axes outside the complete expander.

When such a reverse loop expander is inserted within a piston ring, such as 13 in Figure 3, and is seated against the bottom 14 of the ring groove in a piston, the curved portions 11 of the expander engage with a very limited area of contact against the inner periphery of the piston ring 13, while the curved portions 12 engage with a very limited area of contact against the bottom of the ring groove 14.

Instead of forming the notches 2 and 3 as arcs of a circle, in accordance with the showing of Figure 1, many other specific forms of curvature may be utilized, as, for example, the oval notches 22 and 23, shown in Figure 5. In this embodiment, as in Figure 1, the width of the residual web 21 remaining after the notching operation is substantially the same whether measured from a notch to the opposite marginal edge, as shown at 26, or whether measured between adjacent notches, as shown at 27. Like Figure 1, the embodiment shown in Figure 5 includes a central uninterrupted band, defined by lines 29, constituting at least a third of the overall width of the expander.

A further form is illustrated in Figure 6 wherein the central uninterrupted band, included in the embodiments of Figures 1 and 5, is omitted. In this embodiment, notches 32 and 33 in opposite edges of the ribbon strip 31 extend for substantially half the overall width of the expander, but, again, are so spaced with reference one to the other that the cross section of residual web which separates each notch from its two neighbors in the opposite edge is of substantially the same magnitude as the cross section of residual web which separates the first mentioned notch from the opposite margin of the strip 31. Since the ribbon material is of uniform thickness throughout, the cross section of the web just referred to will be determined by its width and it will be observed that the dimension indicated by the numeral 36 is identical with the dimension indicated by the numeral 37.

In the form shown in Figure 7, the ribbon of expander material 41 is provided with opposite notches 42 and 43, which are arranged with respect to each other in the manner just described in connection with Figure 6, but are formed in the main as arcs of a circle. In this embodiment, however, instead of permitting the contour of the notch to join the marginal edge of the ribbon 41 as a sharp corner, the corners are rounded off, as shown at 44. Again, the residual web of ribbon stock has the same dimension at 46 as at 47.

From the foregoing description, those skilled in the art will understand that, by proportioning and arranging the notches of a ventilated expander in the manner described, a structure is produced which is of substantially uniform resilience and strength throughout its entire length and that, given such a notched strip of material, the same may be curved and crimped in any desired manner without reference to any special orientation of the crimps with reference to the notches. Such flexibility of treatment greatly facilitates the manufacturing operations.

While a number of forms have been disclosed hereinbefore, it is realized that other forms will readily suggest themselves to those skilled in the art and consequently it is to be understood that, consistent with the principles hereinbefore enunciated, the invention is not limited to the particular forms disclosed.

Having thus described the invention, what is claimed and desired to be secured by Letters Patent is:

1. A piston ring expander comprising a ribbon of spring metal having a series of notches in both edges in staggered relation, the cross section of the web of ribbon remaining between a notch and the opposite edge of the ribbon being substantially equal to the cross section of the web of ribbon which separates each notch from the two nearest notches thereto, said notched ribbon being bent into a discontinuous loop whose ends are movable relative to each other and having throughout the periphery of said loop a plurality of spaced crimps curving about an axis lying eccentrically within the loop.

2. A piston ring expander comprising a ribbon of spring metal having a series of notches in both edges in staggered relation, the cross section of the web of ribbon remaining between a notch and the opposite edge of the ribbon being substantially equal to the cross section of the web of ribbon which separates each notch from the two nearest notches thereto, said notched ribbon being bent into a discontinuous loop whose ends are movable relative to each other and having throughout the periphery of said loop a plurality of spaced crimps curving about an axis lying eccentrically within the loop, and said crimps being interconnected by curved portions whose axes lie without the loop.

3. A piston ring expander comprising a ribbon of spring metal having a series of notches in both edges in staggered relation, the cross section of the web of ribbon remaining between a notch and the opposite edge of the ribbon being substantially equal to the cross section of the web of ribbon which separates each notch from the two nearest notches thereto, said notched ribbon being bent into a discontinuous loop whose ends overlap when free and having throughout the periphery of said loop a plurality of spaced crimps curving about an axis lying eccentrically within the loop.

4. The combination with a piston having a ventilated ring groove and a piston ring in said groove, of an expander spring interposed between the inner periphery of the ring and the bottom of the ring groove, said expander spring biasing the ring outwardly and consisting of an imperforate ribbon of spring metal having throughout its length a succession of notches in each of its edges, the notches in one edge being staggered with reference to the notches in the opposite side edge and so spaced that the webs of spring metal which separate one notch from the two nearest notches in the opposite edge are substantially equal in cross section to the web of spring metal which separates said one notch from the opposite edge of the expander, said expander spring being a discontinuous loop whose ends are movable relative to each other.

5. The combination with a piston having a ventilated ring groove and a piston ring in said groove, of an expander spring interposed between the inner periphery of the ring and the bottom of the ring groove, said expander spring biasing the ring outwardly and consisting of an imperforate ribbon of spring metal having throughout its length a succession of notches in each of its edges, the notches in one edge being staggered with reference to the notches in the opposite edge and so spaced that the webs of spring metal which separate one notch from the two nearest notches in the opposite edge are substantially equal in cross section to the web of spring metal which separates said one notch from the opposite edge of the expander, said notched ribbon being bent into a discontinuous loop whose ends are movable relative to each other and having throughout the periphery of said loop a plurality of spaced crimps curving about an axis lying eccentrically within the loop.

6. The combination with a piston having a ventilated ring groove and a piston ring in said groove, of an expander spring interposed between the inner periphery of the ring and the bottom of the ring groove, said expander spring biasing the ring outwardly and consisting of an imperforate ribbon of spring metal having throughout its length a succession of notches in each of its edges, the notches in one edge being staggered with reference to the notches in the opposite edge and so spaced that the webs of spring metal which separate one notch from the two nearest notches in the opposite edge are substantially equal in cross section to the web of spring metal which separates said one notch from the opposite edge of the expander, said notched ribbon being bent into a discontinuous loop whose ends are movable relative to each other and having throughout the periphery of said loop a plurality of spaced crimps curving about an axis lying eccentrically within the loop, and said crimps being interconnected by curved portions whose axes lie without the loop.

GEORGE C. MAYFIELD.

REFERENCES CITED

The following references are of record in the file of this patent:

UNITED STATES PATENTS

| Number | Name | Date |
|---|---|---|
| 345,767 | Buckley | July 20, 1886 |
| 1,796,791 | Johnson | Mar. 17, 1931 |
| 1,869,107 | Marien | July 26, 1932 |
| 1,869,108 | Marien | July 26, 1932 |
| 2,113,857 | Phillips | Apr. 12, 1938 |
| 2,170,276 | Phillips | Aug. 22, 1939 |